US012573022B2

(12) United States Patent (10) Patent No.: US 12,573,022 B2
Mahan (45) Date of Patent: Mar. 10, 2026

(54) ANOMALY DETECTION FOR COMPONENT THROUGH MACHINE-LEARNING BASED IMAGE PROCESSING AND CONSIDERING UPPER AND LOWER BOUND VALUES

(71) Applicant: Yokogawa Electric Corporation, Tokyo (JP)

(72) Inventor: Dakota Mahan, Carrollton, TX (US)

(73) Assignee: Yokogawa Electric Corporation, Tokyo (JP)

( * ) Notice: Subject to any disclaimer, the term of this patent is extended or adjusted under 35 U.S.C. 154(b) by 505 days.

(21) Appl. No.: 18/139,132

(22) Filed: Apr. 25, 2023

(65) Prior Publication Data

US 2024/0362767 A1 Oct. 31, 2024

(51) Int. Cl.
*G06T 7/00* (2017.01)
*B25J 9/16* (2006.01)
*G06T 7/70* (2017.01)
*G06V 10/25* (2022.01)

(52) U.S. Cl.
CPC ........... *G06T 7/0008* (2013.01); *B25J 9/1697* (2013.01); *G06T 7/70* (2017.01); *G06V 10/25* (2022.01); *G06T 2207/20081* (2013.01); *G06T 2207/30244* (2013.01)

(58) Field of Classification Search
CPC ..................... G06T 7/0008; G06T 7/70; G06T 2207/20081; G06V 10/25; B25J 9/1697
See application file for complete search history.

(56) References Cited

U.S. PATENT DOCUMENTS

| 10,572,993 | B2 | 2/2020 | Tanaka et al. |
| 10,607,331 | B1 | 3/2020 | Tandia et al. |
| 2021/0310893 | A1 | 10/2021 | Li et al. |

FOREIGN PATENT DOCUMENTS

| CN | 112464880 | A | * | 3/2021 | ............. | G06F 18/24 |
| CN | 114926682 | | | 8/2022 | | |
| CN | 116416535 | A | * | 7/2023 | ............. | G06V 20/17 |
| EP | 3968103 | | | 3/2022 | | |
| GB | 2542118 | | | 3/2017 | | |
| KR | 20220164097 | A | * | 12/2022 | ............... | G06N 3/08 |

* cited by examiner

*Primary Examiner* — Wednel Cadeau
(74) *Attorney, Agent, or Firm* — Gray Ice Higdon

(57) ABSTRACT

Implementations process an image, using a machine learning (ML) model, to generate a reduced dimensionality ML output. The image captures component(s) of an environment (e.g., an industrial automation facility) and can be captured via a vision component of a mobile robot within the environment. The ML output indicates, for each of N regions of the image, a corresponding anomaly detection probability that indicates whether an anomaly is present in a respective region, of the N regions of the image. Those implementations determine, based on the ML output, a quantity of anomaly detection probabilities that each satisfy a threshold. Those implementations further determine whether the quantity is both greater than a lower bound value and less than an upper bound value and, if so, cause remediating action(s) to be performed, such as causing rendering of an alert that indicates an anomaly is present for the component(s).

19 Claims, 4 Drawing Sheets

200

102

1st pixel          nth pixel

1st pixel mth pixel

13th region

T

101

211

IMAGE 201    INPUT    OUTPUT    ML OUTPUT 221

ANOMALY?

YES

REMEDIATING ACTION(S)

$$M1 = \begin{bmatrix} p1 & p2 & p3 & p4 \\ p5 & p6 & p7 & p8 \\ p9 & p10 & p11 & p12 \\ p13 & p14 & p15 & p16 \end{bmatrix}$$

Figure 3:
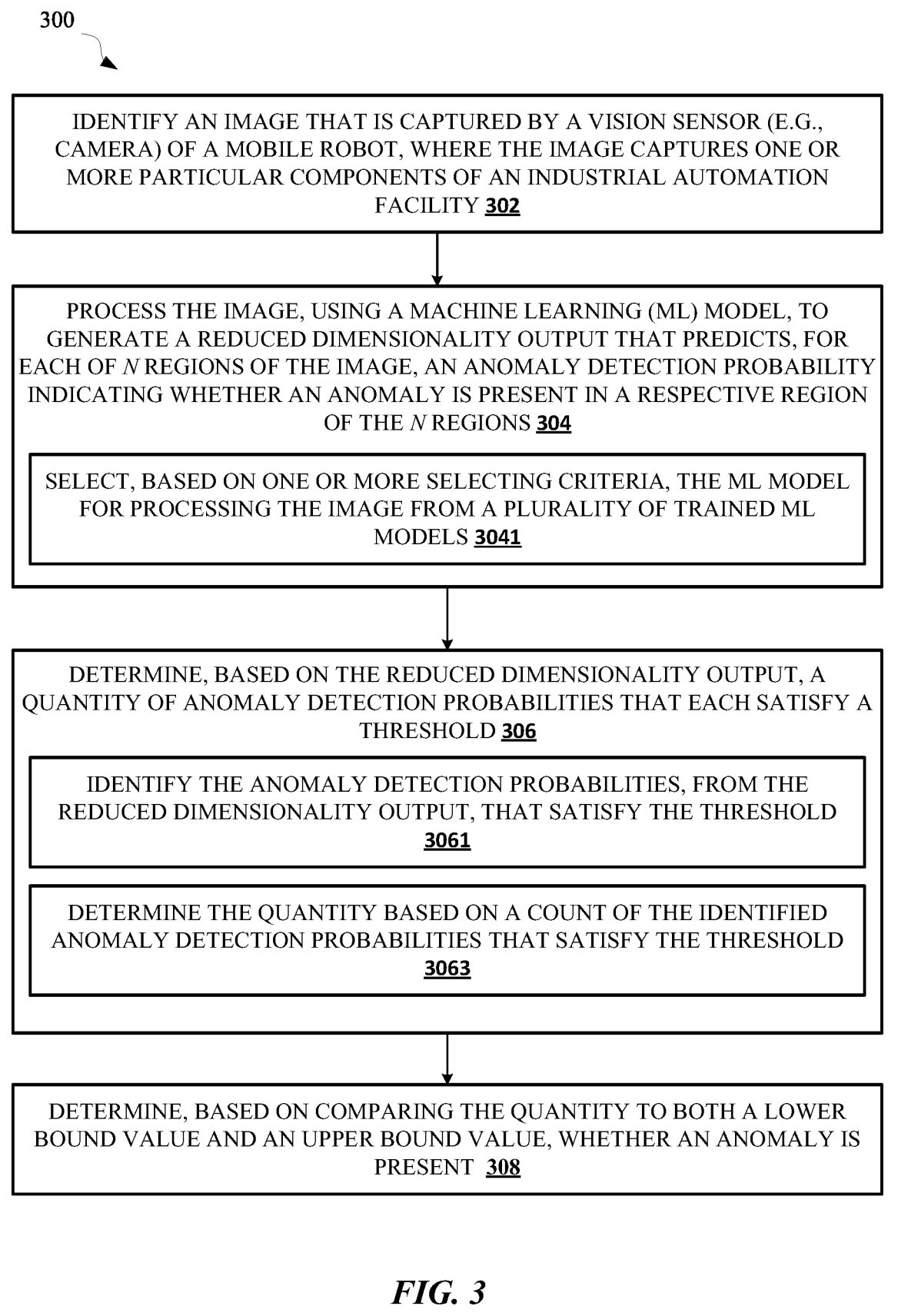

300

IDENTIFY AN IMAGE THAT IS CAPTURED BY A VISION SENSOR (E.G., CAMERA) OF A MOBILE ROBOT, WHERE THE IMAGE CAPTURES ONE OR MORE PARTICULAR COMPONENTS OF AN INDUSTRIAL AUTOMATION FACILITY 302

PROCESS THE IMAGE, USING A MACHINE LEARNING (ML) MODEL, TO GENERATE A REDUCED DIMENSIONALITY OUTPUT THAT PREDICTS, FOR EACH OF $N$ REGIONS OF THE IMAGE, AN ANOMALY DETECTION PROBABILITY INDICATING WHETHER AN ANOMALY IS PRESENT IN A RESPECTIVE REGION OF THE $N$ REGIONS 304

SELECT, BASED ON ONE OR MORE SELECTING CRITERIA, THE ML MODEL FOR PROCESSING THE IMAGE FROM A PLURALITY OF TRAINED ML MODELS 3041

DETERMINE, BASED ON THE REDUCED DIMENSIONALITY OUTPUT, A QUANTITY OF ANOMALY DETECTION PROBABILITIES THAT EACH SATISFY A THRESHOLD 306

IDENTIFY THE ANOMALY DETECTION PROBABILITIES, FROM THE REDUCED DIMENSIONALITY OUTPUT, THAT SATISFY THE THRESHOLD 3061

DETERMINE THE QUANTITY BASED ON A COUNT OF THE IDENTIFIED ANOMALY DETECTION PROBABILITIES THAT SATISFY THE THRESHOLD 3063

DETERMINE, BASED ON COMPARING THE QUANTITY TO BOTH A LOWER BOUND VALUE AND AN UPPER BOUND VALUE, WHETHER AN ANOMALY IS PRESENT 308

ANOMALY DETECTION FOR COMPONENT THROUGH MACHINE-LEARNING BASED IMAGE PROCESSING AND CONSIDERING UPPER AND LOWER BOUND VALUES

BACKGROUND

A complex industrial facility such as a petrochemical refinery, a chemical plant, etc., can include numerous components that are utilized in the processing of liquid(s), gas(es), and/or of other matter(s) involved in the industrial process(es) of the industrial facility. It is important to ensure that the components that are involved in the industrial process(es) are operating as intended and/or to ensure that matter(s) involved in the industrial process(es) are in their intended states.

Various sensors have been utilized in industrial facilities to monitor for anomalies in such component(s) and/or matter(s). Such sensors include temperature sensors utilized to monitor for temperature anomalies in component(s) and/or matter(s), optical sensors utilized to monitor for anomalies in compositions of matter(s) (e.g., based on exciting those matter(s) with a light source), etc.

While various sensors can be utilized in an industrial facility to monitor for various anomalies, such sensors are each typically deployed in a corresponding fixed location within the industrial facility. Accordingly, a very large quantity of sensors can be needed to effectively monitor an industrial facility. Further, providing power and/or communication to each of the sensors can require extensive wiring throughout the industrial facility. Yet further, the large quantity of sensors are each subject to failure or malfunction and must be serviced and/or replaced when that occurs-which can be difficult in a large industrial facility that includes a large quantity of fixed sensors.

SUMMARY

Implementations of the present disclosure are directed to utilizing a mobile robot to capture, via a camera of the mobile robot and at a given pose, an image of component(s) and/or matter(s) in an environment, such as in an industrial facility or other environment. Those implementations are further directed to processing the captured image, using a machine learning (ML) model, to generate ML output. The machine learning model can be a neural network model, such as a convolutional neural network (CNN) model that includes one or more convolutional layers. Those implementations are further directed to determining, based on the generated ML output, whether there is an anomaly with the component(s) and/or matter(s) that are captured by the image and, if so, causing one or more remediating action(s) to be performed. Causing remediating action(s) to be performed can include, for example, causing alert(s) to be rendered, causing process(es) to be halted, and/or causing other remediating action(s) to be performed.

In many implementations, the utilized ML model can be one trained to be used to process an image to generate a reduced dimensionality ML output that is of a reduced dimensionality relative to the processed image. Each value in the reduced dimensionality ML output can reflect, directly or indirectly, a probability that a corresponding region of the image includes an anomaly. For example, each value can be a corresponding value between 0 and 1, and each value can correspond to a corresponding portion of the image that encompasses multiple pixels of the image (e.g., a corresponding 64×64 pixel portion of the image). In those implementations, determining whether an anomaly is present can be based on determining a quantity of the values that satisfy a threshold (e.g., a threshold such as 0.7), and determining that the anomaly is present only when the quantity is both (a) greater than a lower bound value and (b) less than an upper bound value. For example, assume the ML output includes 16 values. An anomaly can be detected only when the quantity of the values, that satisfy the threshold, is greater than 1 or 2 (or other lower bound value), but less than 8 or 9 (or other upper bound value).

Occurrences of false positive and/or false negative anomaly detection can be mitigated through determining that an anomaly is present only when the quantity is both (a) greater than a lower bound value and (b) less than an upper bound value. For example, false positive occurrences of detecting an anomaly can be prevented by considering the upper bound value in addition to the lower bound value. For instance, false positive occurrences can be prevented by not determining that an anomaly is present when the quantity of the values that satisfy the threshold is greater than the upper bound value. For example, when the quantity of the values that satisfy the threshold is greater than the upper bound value, implementations disclosed herein recognize that it is likely not due to an anomaly but, rather, due to other external factor(s) of the environment such as too much light (e.g., from the sun and/or lighting device(s)), a person or other mobile object being present in the image, and/or issues with the camera that captured the image. Mitigating occurrences of false positives can, for example, prevent utilization of network and/or computing device resources in incorrectly causing remediating action(s) to be performed, such as causing false positive alarms to be rendered. Mitigating occurrences of false negatives can prevent occurrences of unsafe conditions in the industrial facility and/or damage to component(s) and/or matter(s) of the industrial facility.

In some implementations, the same lower bound value and/or the same upper bound value can be used in determining, for each of multiple disparate component(s) and/or matter(s) in an environment, whether an anomaly is present. For example, the same lower bound value (e.g., 2) and the same upper bound value (e.g., 11) can be utilized in analyzing both (a) first ML output generated based on processing a first image of a tank (in a first area of the environment) using an ML model and (b) second ML output generated based on processing a second image of piping (in a second area of the environment).

In some additional or alternative implementations, a lower bound value and/or an upper bound value used for a first component can differ from a lower bound value and/or upper bound value used for a second component. For example, a first image, that is determined (e.g., based on metadata of the first image) to capture the first component, can be processed using an ML model to generate first ML output, a first quantity of values of the first ML output that satisfy a threshold can be determined, and an anomaly for the first component determined only if the first quantity is between 2 and 9. Continuing with the example, a second image, that is determined to capture the second component (e.g., based on metadata of the second image), can be processed using the ML model to generate second ML output, a second quantity of values of the second ML output that satisfy a threshold can be determined, and an anomaly for the second component determined only if the first quantity is between 3 and 8—which is a more restrictive band than that utilized for the first image determined to capture the first component. The more restrictive band will be less likely to lead to an anomaly being determined. In some of those implementations, the less restrictive band and/or the more restrictive band can optionally be explicitly manually specified, based on user interface input. The manual specification can reflect the criticality of the respective components (e.g., first component can be more critical than second component) and/or can be based on additional or alternative consideration(s) such as how dynamic the area in which the component is located is expected to be. In some other of those implementations, the less restrictive band and/or the more restrictive band can optionally be set in dependence on implicit user interface input. For example, the band for the second component may have originally been between 2 and 9, but can be automatically adjusted to the more restrictive between 3 and 8 based on prior instance(s) of user feedback indicating that anomalies, determined based on the between 2 and 9 band, were not actual anomalies. For instance, the prior instances of user feedback could have been provided by operator(s) after reviewing image(s) of the first component and/or after inspecting the first component in person (e.g., feedback indicating that a prior anomaly detection was incorrect).

In some implementations, the same lower bound value and/or the same upper bound value can always be used in determining, for a given component and/or for given matter in an environment, whether an anomaly is present.

In some alternative implementations, a lower bound value and/or an upper bound value that is used for the given component and/or the given matter can vary dynamically over time. For example, a more restrictive band can be used during certain temporal condition(s) (e.g., day(s) of the week, time(s) of day, date(s) of the year) and a less restrictive band can be used during certain other temporal condition(s). As another example, a first band can be used for a first duration of time, then adjusted to a more or less restrictive band based on explicit or implicit user input(s), such as those described above.

A captured image can be a high-resolution image having an image dimension (sometimes referred to as "pixel dimension") of m×n×c pixels, where m is a width dimension, n is a height dimension, and c is a channel dimension. For example, c can be 3 when the image is a red, green, blue (RGB) image and c can be 1 when the image is a grayscale image. The m×n values can be, for example, 1024×1024, 1024×768, 2048×2048, or other values. The reduced dimensionality ML output, that includes a plurality of probabilities, can, for example, be arranged in a q1×q2 matrix, where the dimensionality of q1×q2 is less than the dimensionality of m×n. For instance, the reduced dimensionality ML output can be a 2×2 matrix that defines 4 different probabilities (p1, p2, p3, p4), where p1 is a probability indicating an anomaly is present in a first region of the image, p2 is a probability indicating an anomaly is present in a second region of the image, p3 is a probability indicating an anomaly is present in a third region of the image, and p4 is a probability indicating an anomaly is present in a fourth region of the image. The first, second, third, and fourth regions can collectively correspond to all regions of the image. The first, second, third and fourth regions can correspond to fully unique regions of the image, or one or more of the regions can partially overlap with other of the region(s).

The mobile robot that is utilized in capturing images, that are processed in monitoring for anomalies according to techniques disclosed herein, can be a quadruped robot, a wheeled robot, an unmanned aerial vehicle, a track-guided robot, or any other robot that moves itself within the environment. The images are captured via a vision component of the mobile robot. Each image is captured when the vision component is at a corresponding pose (i.e., a given position and orientation). The pose of the vision component when an image is captured at a given time will be a function of the pose of the robot at the given time. When the vision component is at a fixed pose relative to the robot, the pose of the vision component will be purely a function of the pose of the robot. When the pose of the vision component pose is independently adjustable relative to the robot, the pose of the vision component will be a function of the pose of the robot and a pose of the vision component relative to the robot. Images that are utilized herein can include, for example: an RGB image that includes a red channel, a green channel, and a blue channel and that is captured by a monographic RGB camera; an RGB-D image that includes a depth channel in addition to red, green, and blue channels, and that is captured by a stereographic camera; an ultraviolet (UV) image that includes a UV channel and that is captured by a UV camera; or a thermal image that includes one or more thermal channels and that is captured by a thermal camera.

Through utilizing the mobile robot, that includes the vision component and that moves around within an industrial environment and capture images of component(s) and/or matter(s) that are of interest for anomaly monitoring/detection, the number of sensors monitoring the industrial environment can be reduced and/or extensive wiring needed for such sensors can be avoided. Moreover, by processing captured images using an ML model to generate ML output with a plurality of values, and determining that an anomaly is present only when a quantity of those values that satisfy a threshold is both (a) greater than a lower bound value and (b) less than an upper bound value, accuracy of anomaly detection can be improved. This enables anomaly detection to be more robust and/or more accurate.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example method for performing selected aspects of the present disclosure.

DETAILED DESCRIPTION

Implementations described herein pertain to monitoring and detecting anomalies related to a component (e.g., a liquid tank, piping, wiring) within an environment (e.g., an industrial automation facility), based on ML output (e.g., a reduced dimensionality output) that is generated by processing an image, that captures the component, using a trained ML model (e.g., a trained neural network model). In various implementations, the image of the component is captured by a vision component (e.g., camera) that is carried by, or integrated with, a mobile robot movable within the environment. The reduced dimensionality ML output can indicate, for each of N regions of the image, a corresponding probability that an anomaly is present in a respective region of the image. Determining whether an anomaly is present can be based on analyzing the reduced dimensionality ML output. For example, each value in the reduced dimensionality ML output can reflect a probability that a corresponding region of the image includes an anomaly, and an anomaly can be determined to be present only when a quantity of the values, that satisfy a threshold, is both greater than a lower bound value and less than an upper bound value. Implementations further pertain to causing one or more remediating actions to be performed in response to detecting an anomaly is present within the environment. As referenced, each value in the reduced dimensionality output can reflect a probability that a corresponding region of the image includes an anomaly. In some implementations, the values can directly reflect the probabilities. For example, each value can be a corresponding value between 0 and 1, and can directly reflect the probabilities. For instance, a value of 0.18 can reflect an 18% probability. In some implementations, the values can indirectly reflect the probabilities. For example, each value can be a corresponding value between 0 and 8, and can indirectly reflect the probabilities. For instance, a value of 2 can reflect a 25% probability.

Figure 1:
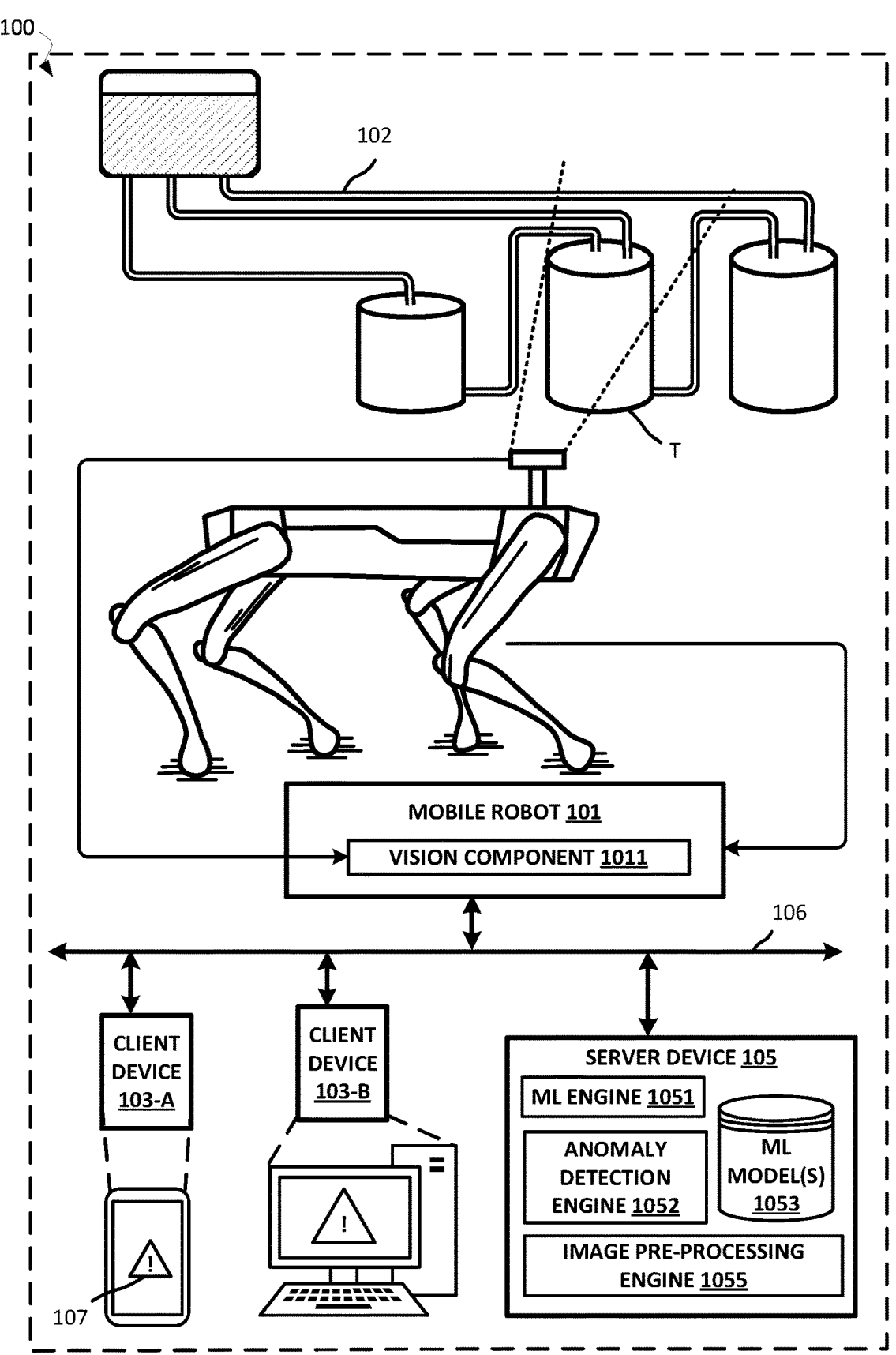
FIG. 1 schematically depicts an environment in which selected aspects of the present disclosure can be implemented, in accordance with various implementations.

Referring now to FIG. 1, an example environment 100 in which various aspects of the present disclosure can be implemented is depicted schematically. In some implementations, the example environment 100 can be, or can include, an industrial automation facility. The industrial facility can take numerous forms and can be designed to implement any number of at least partially automated processes. The industrial automation facility can take the form of a chemical processing plant, an oil or natural gas refinery, a catalyst factory, a manufacturing facility, an offshore oil platform, etc.

The example environment 100 can include one or more client devices (e.g. local client devices 103-A and 103-B) operably coupled with a process automation network 106 in the industrial automation facility. The client device 103-A or 103-B can be implemented as a computer (e.g., laptop, desktop, notebook), a tablet, a robot, a smart appliance (e.g., smart phone), a messaging device, a wearable device (e.g., watch), or any other applicable device. The process automation network 106 can be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh).

The example environment 100 can further include a mobile robot 101 having or carrying a vision component 1011. The mobile robot 101 can be a quadruped robot (e.g., a robot dog), a wheeled robot, an unmanned aerial vehicle, a robot that moves along elevated and/or non-elevated tracks within the environment, or any other applicable robot movable within the industrial facility. The vision component 1011 can be a monographic camera, a stereographic camera, a thermal camera, or any other applicable vision sensor, to capture one or more images of one or more particular components (e.g., a liquid tank T or tube 102 storing or transporting a liquid matter) of the industrial automation facility. The vision component 1011 can be removably coupled to the mobile robot 101, or can be integrated as a non-removable cohesive part of the mobile robot 101. In some implementations, the vision component 1011 can change location and/or orientation independently with respect to a robot frame of the mobile robot 101, for example, by rotation or other movement via actuator(s) that independently control the vision component 1011. The mobile robot 101 can, in addition to the vision component 1011, include one or more additional vision components to navigate through the industrial facility, sense static or dynamic objects, and/or to capture images.

The example environment 100 can further include a server computing device 105. The server computing device 105 can include a machine learning (ML) engine 1051, and an anomaly detection engine 1052. The server computing device 105 can further include, or otherwise access, one or more trained machine learning (ML) models 1053 that are each trained to generate output indicating multiple probabilities, with each of the probabilities indicating a likelihood that an anomaly is present for a respective region of N regions of a processed image. The server computing device 105 can be connected to a plurality of client devices. The server computing device 105 can be in communication with one or more local client devices (e.g., 122-A and 122-B), and/or be in communication with one or more remote client devices (not illustrated). The local client device 122-A or 122-B can be connected to the server computing device 105 via one or more local area networks (e.g., the process automation network 106), and the remote client device can be connected to the server computing device 105 via one or more wide area networks (e.g., the Internet). The local client device(s) and the remote client device(s) can be operable by personnel such as system integrators to configure and/or interact with various aspects of the example environment 100.

In some implementations, the server computing device 105 can, in addition to the ML engine 1051 and the anomaly detection engine 1052, include a database (not illustrated) that stores information used by the ML engine 1051 and/or the anomaly detection engine 1052 to practice selected aspects of the present disclosure. In some implementations, the server computing device 105 may, in addition to the ML engine 1051 and the anomaly detection engine 105, include an image pre-processing engine 1055 that processes different images to have the same image dimensions. Various aspects of the server computing device 105, such as the ML engine 1051, the anomaly detection engine 1052, and/or the image pre-processing engine 1055, can be implemented using any combination of hardware and software. In some implementations, the ML engine 1051, the anomaly detection engine 1052, the image pre-processing engine 1055, or the trained ML model(s) 1053 can be implemented across multiple computer systems as part of what is often referred to as a "cloud infrastructure" or simply the "cloud." However, this is not required, and in FIG. 1, for instance, the ML engine 1051 is implemented within the industrial facility, e.g., in a single building or across a single campus of buildings or other industrial infrastructure. In such an implementation, the ML engine 1051 can be implemented on one or more local computing systems, such as on one or more local server computers.

In some implementations, the mobile robot 101 can navigate through the industrial facility and arrive at one or more designated spots or waypoints. The vision component 1011 of the mobile robot 101 can be (but not necessarily need to be) configured at a given pose, to capture an image of the liquid tube 102 at the given pose. The vision component 1011 can be configured at the given pose as a result of the mobile robot 101 being at a corresponding pose and/or as a result of the vision component 1011 being independently adjusted (when the vision component 1011 is independently adjustable relative to a robot frame of the mobile robot 101). The image captured by the vision component 1011 can include pixels or other data that capture and correspond to an area of interest or the component, e.g., liquid tank T and a liquid matter contained therein (as shown in FIG. 1).

The captured image can be processed, by the ML engine 1051, as input to a trained ML model, to generate a ML output. The ML output can be a reduced dimensionality output indicating, for each of N regions of the image, a corresponding probability that an anomaly is present in a respective region of the N regions. The anomaly detection engine 1052 can process the ML output in determining whether an anomaly is present for the component and, if an anomaly is determined to be present, can cause one or more remediating actions to be performed to address the detected anomaly. For example, the anomaly detection engine 1052 can cause audible and/or visual alert(s) to be rendered at computing device(s), such as visual alert 107 that is visually rendered at client device 103-A.

Although only a single mobile robot 101 is illustrated in FIG. 1, it is understood that multiple mobile robots can be deployed in an industrial environment and utilized in implementations disclosed herein. For example, each of multiple mobile robots can include a corresponding vision component that is used to capture images, and the images from multiple mobile robots transmitted to the server device 105 for processing by the ML engine 1051 and the anomaly detection engine 1052. Also, although ML engine 1051, ML model(s) 1053, anomaly detection engine 1052, and image pre-processing engine 1055 are illustrated in FIG. 1 as being implemented separate from the mobile robot 101, in some implementations all or aspects can be implemented by the mobile robot 101. For example, the mobile robot 101 can include the ML engine 1051, the anomaly detection engine 1052, and at least a subset of the ML model(s) 1053. For instance, the mobile robot 101 can include, at a given time, a subset of the ML model(s) 1053 based on that subset corresponding to component(s), of which the mobile robot 101 will capture images on a mission to be performed by the mobile robot 101 at the given time.

Figure 2:
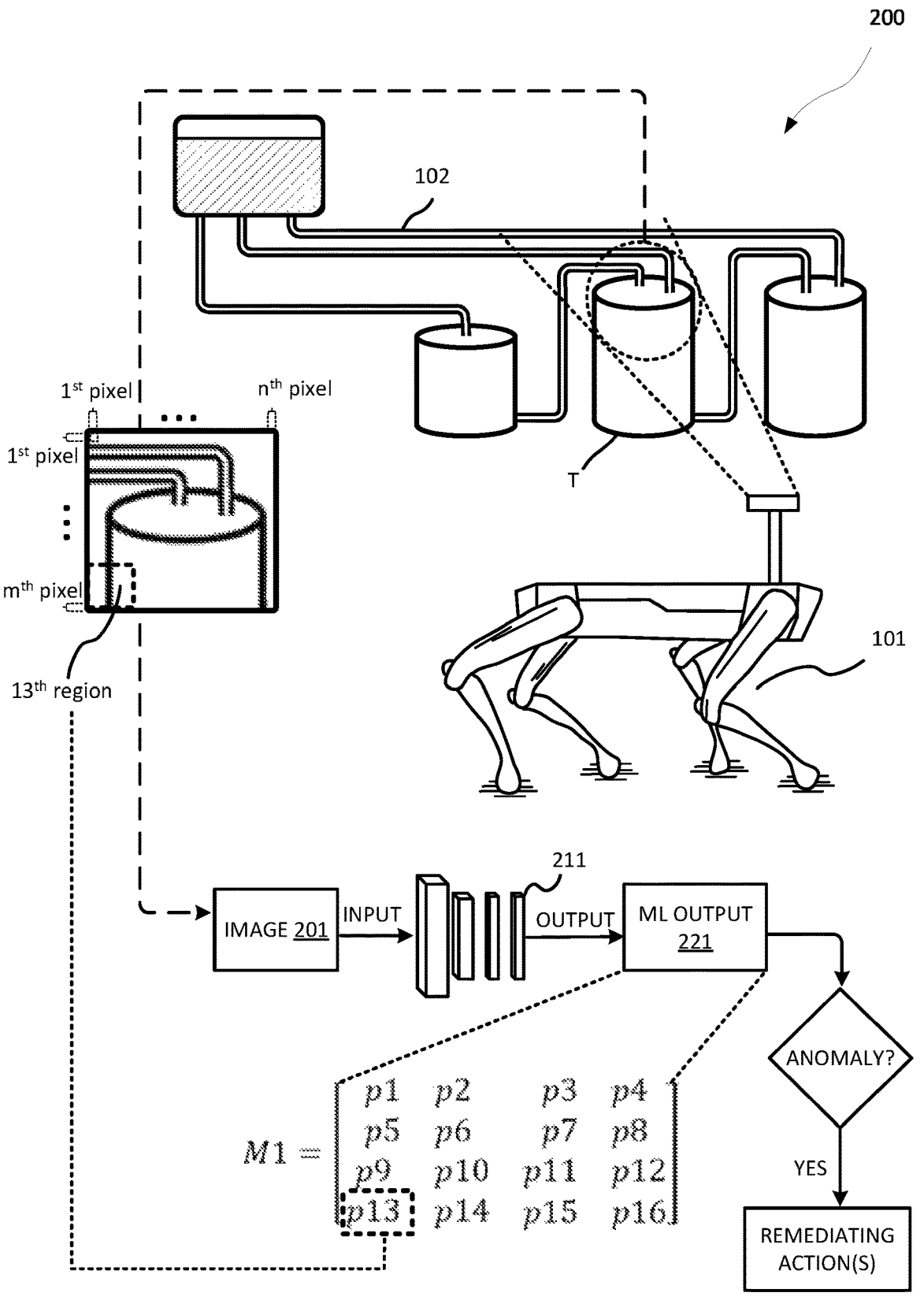
FIG. 2 schematically depicts an example of how techniques described herein can be implemented, in accordance with various implementations.

FIG. 2 schematically depicts an example of how techniques described herein can be implemented, in accordance with various implementations. As shown in FIG. 2, a vision component 1011 of a mobile robot 101 can capture an image 201. The image 201 captures a particular component (e.g., liquid tank T and liquid carried by the liquid tank) within an industrial automation facility. The vision sensor captures the image 201 at a given pose. The image 201 can have an image dimension of m×n pixels (and c channel(s)), and can be processed using a trained ML model 211, which can be one of (e.g., the only one of, or one of multiple of) the ML model(s) 1053 of FIG. 1. The trained ML model 211 can be trained for use in processing an image to generate ML output indicating, for each of multiple regions of the image, a corresponding probability that an anomaly is present within the region.

In some implementations the trained ML model 211 is selected, from multiple candidate of the ML model(s) 1053, for processing the image 201. In some of those implementations, it is selected for processing the image 201 based on the image 201 capturing the particular component (e.g., liquid tank T) and the ML model 211 being trained based on training instances that include training instance input of an image that also captures the particular component (e.g., liquid tank T) and training instance output of ground truth probabilities. For example, the trained ML model 211 can be fine-tuned based on such training instance(s). In some of those implementations, metadata that is incorporated in, or included with, the image 201 can indicate, directly or indirectly, the particular component, and such metadata can be used in selecting the trained ML model 211. For instance, the metadata can indicate a location at which the image was captured, and such location can be correlated to the particular component and/or to the trained ML model 211.

In some additional or alternative implementations, the trained ML model 211 is one trained based on training instances that each include training instance input of an image that also captures the particular component (e.g., liquid tank T) with a corresponding vision component that is at or near the given pose of image 201, and training instance output of ground truth probabilities. For example, the trained ML model 211 can be fine-tuned based on such training instance(s). In some of those implementations, the trained ML model 211 is selected based on determining the image 201 captures the particular component at the given pose, and determining that the trained ML model 211 is one fine-tuned based on training instance(s) for the particular component and for the given pose. For example, metadata that is incorporated in, or included with, the image 201 can indicate, directly or indirectly, the given pose, and such metadata can be used in selecting the trained ML model 211. For instance, the metadata can indicate the given pose of the vision component when the image was captured, and the given pose can be correlated to the trained ML model 211.

In some additional or alternative implementations, the trained ML model 211 can be selected from the plurality of trained ML models based on the image dimensions of the image 201.

The image 201 can be processed, using the ML model 211, to generate a ML output 221 of the ML model 211. The ML output 221 can be a reduced dimensionality output that indicates, for each of N regions of the image 201, a corresponding probability (also referred to herein as an "anomaly detection probability") that an anomaly is present in a respective region of the N regions. The ML output 221 can indicate or include a plurality of anomaly detection probabilities arranged in a matrix (e.g., a vector or a multidimensional matrix), where a position of an $i^{th}$ anomaly detection probability in the matrix corresponds to a location of an $i^{th}$ region within the image 201 ($0 < i \leq N$).

As a non-limiting example, referring to FIG. 2, the reduced dimensionality output can include the first, second, . . . , and sixteenth probabilities, arranged in a matrix M1, also shown below. In the matrix M1, the location of a probability (e.g., p13) can correspond to the location of a respective region (e.g., the 13th region as shown in FIG. 2), in the image 201, for which the probability (e.g., p13) is predicted.

$$M1 = \begin{bmatrix} p1 & p2 & p3 & p4 \\ p5 & p6 & p7 & p8 \\ p9 & p10 & p11 & p12 \\ p13 & p14 & p15 & p16 \end{bmatrix}$$

Based on the ML output 221 (i.e., the reduced dimensionality output), whether an anomaly is detected for the particular component can be determined. For example, based on the plurality of anomaly detection probabilities indicated by the ML output 221, it can be determined whether an anomaly is detected for the particular component. In some implementations, a quantity of anomaly detection probabilities that satisfy a threshold (e.g., 0.7 or other threshold) can be determined from the N anomaly detection probabilities. Referring to FIGS. 2, p1, p2, p4, p5, p8, and p9 can be identified as satisfying the threshold (e.g., 0.7) and, as a result, the quantity of anomaly detection probabilities satisfying the threshold can be determined to be "6". In those implementations, if the quantity (e.g., 6) of anomaly detection probabilities that satisfy a threshold (e.g., 0.7) is both greater than a lower bound value (e.g., "1") and less than an upper bound value (e.g., "11"), the image 201 of the particular component can be determined to capture an anomaly associated with the particular component. As described herein, the lower bound value and/or the upper bound value can optionally be dependent on the particular component being captured (e.g., as indicated by metadata of the image 201), temporal condition(s), and/or other factor(s). Put another way, in some implementations, the lower bound value and/or the upper bound value can be dynamic for a given component and/or on a component-by-component basis.

In response to a determination that the image 201 captures an anomaly, one or more remediating actions can be performed. The one or more remediating actions can include causing an alert to be rendered visually and/or audibly. Alternatively or additionally, the one or more remediating actions can include causing one or more processes to be paused, such as one or more processes involving the particular component. Alternatively or additionally, the one or more remediating actions can include notifying one or more operators to examine the particular component.

FIG. 3 is a flowchart illustrating an example method 300 of practicing selected aspects of the present disclosure, in accordance with implementations disclosed herein. For convenience, the operations of the flow chart are described with reference to a system that performs the operations. This system can include various components of various computer systems, such as one or more components of the server computing device 105 (and/or additional computing devices such as the mobile robot 101 or the client device 103-A), including the ML engine 1051 and/or the anomaly detection engine 1052. Moreover, while operations of method 300 are shown in a particular order, this is not meant to be limiting. One or more operations can be reordered, omitted or added.

At block 302, the system identifies an image that is captured by a vision component (e.g., camera) of a mobile robot, where the image captures one or more particular components of an industrial automation facility. The industrial automation facility can be a chemical processing plant, an oil or natural gas refinery, a catalyst factory, a manufacturing facility, an offshore oil platform, or any other applicable facility implementing one or more at least partially automated processes. The one or more particular components, as a non-limiting example, can include: a liquid tank and/or a liquid the liquid tank carries. The mobile robot can be a quadruped robot (e.g., a robot dog), a wheeled robot, an unmanned aerial vehicle, or any other applicable robot movable within the industrial automation facility.

The vision component can be a monographic RGB camera, a stereographic camera, a thermal camera, a UV camera, or any other applicable vision component. The image captured by the vision component can correspondingly be an RGB image, an RGB-D image, a UV image, a thermal image, or any other applicable image. In some implementations, the vision sensor can be integrated with the mobile robot, or can be removably coupled to the mobile robot.

At block 304, the system processes the image, using an ML model (e.g., a CNN or other neural network model), to generate a reduced dimensionality output that indicates or predicts, for each of N regions of the image, an anomaly detection probability (sometimes simply referred to as a "probability") indicating whether an anomaly is present in a respective region of the N regions. The value of "N" can be, for instance, greater than or equal to 9, but this is not intended to be limiting. For example, the value N can be equal to 4, 6, 25, 36, or any other applicable positive integer.

The ML model that is used by the system at block 304 in processing the image can be trained based on one or more training instances each including: training instance input of a corresponding image, and training instance output of N corresponding ground truth labels each indicating whether anomaly is present in a respective region, of N regions, of the respective image. For example, each of the ground truth labels can be either an "anomaly present" label (e.g., "1") or a "no anomaly present" label (e.g., 0). The "anomaly present" label can be applied for the label(s) that correspond to region(s), if any, of the corresponding image that include an anomaly and the "no anomaly present" label applied for the label(s) that correspond to region(s), if any, of the corresponding image that do not include an anomaly. For example, if the anomaly is corrosion and corrosion is present in only 2 of 16 regions of the image, the ground truth labels can include 2 "anomaly present" labels that correspond to the 2 anomaly regions of the image and 14 "no anomaly present" labels that correspond to the 14 no anomaly regions of the image.

In some implementations, the system optionally, at block 3041, selects the ML model for processing the image from a plurality of trained ML models. In some of those implementations, the system selects the ML model for processing the image based on the image capturing the one or more particular components and the ML model being trained based on images corresponding to the one or more particular components. In some additional or alternative of those implementations, the system selects the ML model from the plurality of trained ML models based on the image being captured at a given pose (e.g., a first pose, which corresponds to a first position and/or a first orientation of the vision component) and the ML model being trained based on images corresponding to the given pose. In some additional or alternative of those implementations, the system selects the ML model from the plurality of trained ML models based on the image based on a type (e.g., thermal, RGB, RGB-D) and/or image dimension (e.g., 1024×768 pixels) of the image.

As a non-limiting example, the plurality of trained ML models can include a first ML model trained using images captured by the vision sensor at a first pose, where the first ML model is trained to process a first image captured by the vision sensor at the first pose to output a first quantity ("N_1") of anomaly detection probabilities for a total number of N_1 regions of the first image captured at the first pose. The plurality of trained ML models can include a second ML model trained using images captured by the vision sensor at a second pose, where the second ML model is trained to process a second image captured by the vision sensor at the second pose to output a second quantity ("N_2") of anomaly detection probabilities for a total number of N_2 regions of the second image captured at the second pose. The second quantity ("N_2") can optionally be different from the first quantity ("N_1"), and the first pose is distinct from the second pose. The plurality of trained ML models can include additional ML models such as a third ML model trained based on images captured at a third pose.

At block 306, the system can determine, based on the reduced dimensionality output, a quantity of anomaly detection probabilities that each satisfy a threshold. In some implementations, the system can, at block 3061, identify the anomaly detection probabilities, from the reduced dimensionality output, that satisfy the threshold. The system can, at block 3063, determine the quantity based on a count of the identified anomaly detection probabilities that satisfy the threshold. For example, assume the threshold is 0.7 and the reduced dimensionality output indicates a total number of 16 anomaly detection probabilities: 0.65, 0.72, 0.65, 0.45, 0.55, 0.78, 0.85, 0.8, 0.85, 0.55, 0.45, 0.82, 0.78, 0.48, 0.58, 0.63. In such an example, the anomaly detection probabilities that satisfy the threshold (0.7) can be identified to include: 0.72, 0.78, 0.85, 0.8, 0.85, 0.82, 0.78. In this example, the quantity of the anomaly detection probabilities identified as satisfying the threshold can be determined to be "7".

At block 308, the system determines, based on comparing the quantity to both a lower bound value and an upper bound value, whether an anomaly is present. For example, the system can determine an anomaly is present only when the quantity is both higher than the lower bound value and lower than the upper bound value. In some implementations, the lower bound value and/or the upper bound value are static. In some implementations, the lower bound value and the upper bound value can be determined based on a value of "N" (i.e., the quantity of regions reflected in the reduced dimensionality output). For example, the lower bound value can be 20% or less of N, such as approximately 10% of the value of "N". Also, for example, the upper bound value can be 50% or more of N, such as 90% of the value of "N".

Alternatively or additionally, in some implementations, the lower bound value, and/or the upper bound value, can be dynamic. For example, one or both can be determined based on type(s) or other characteristic(s) of component(s) captured by the image, current temporal condition(s), a detected or inferred light level in the industrial automation facility, and/or other factor(s). For example, the lower bound value that is utilized during daytime hours and/or during periods of higher light levels can be different from the lower bound value that is utilized during nighttime hours and/or during periods of lower light levels.

As a non-limiting example, "N" can have a value of 16. In this example, the lower bound value can be predefined to be "1" or "2", and the upper bound value can be predefined to be "7" or "8". When the quantity of the anomaly detection probabilities identified as satisfying the threshold is determined to be "5" which is greater than the lower bound value and is less than the upper bound vale, the image for which the anomaly detection probabilities are predicted can be determined to capture an anomaly for the one or more particular components.

Additionally, in some implementations, the system can, in response to determining that the quantity is greater than the lower bound value and is less than the upper bound value: cause rendering of an alert that indicates an anomaly is present for the one or more particular components. Alternatively or additionally, the system may, in response to determining that the quantity is greater than the lower bound value and is less than the upper bound value: cause one or more processes to be paused.

In some implementations, the system can determine that the quantity is less than or equal to the lower bound value. In those implementations, the system can determine, in response to determining that the quantity is less than or equal to the lower bound value, that no anomaly is detected for the one or more particular components.

In some implementations, the system can determine that the quantity is greater than or equal to the upper bound value. In these implementations, the system can generate a notification recommending a manual review of the image to determine whether the image is suitable for detecting an anomaly for the one or more particular components. For instance, if the image is captured while the vision sensor is subject to too much light or if the image captures a moving object instead of the one or more particular components, the image can be identified as not including an anomaly for the one or more particular components. Such an image can optionally be used to further train the ML model, along with supervised labeled output that indicates no anomalies for any of the N regions. Optionally, the system can further control the mobile robot to capture an additional image via the vision sensor. Optionally, the additional image can be captured at a different pose than the image processed for anomaly detection, and a different ML model can be selected to process the additional image to confirm whether anomaly is detected or not.

Instead of or in addition to determining to cause rendering of the alert, the system can perform one or more other remediating actions. The one or more other remediating actions can include: pausing or stop one or more industrial processes (e.g., automation processes), such as those involving the one or more particular components for which anomaly is detected. For example, the system can determine, based on both the first output and the second output, to cause pausing of a process, within the industrial automation facility, that involves the one or more particular components.

In some implementations, at least some aspects of methods described herein are performed by one or more processors of one or more computing devices that are separate from the mobile robot and non-attached to the mobile robot. In some of those implementations, the image(s) are transmitted to the computing device(s) by the mobile robot and identified by the computing device(s) after being transmitted by the mobile robot.

Figure 4:
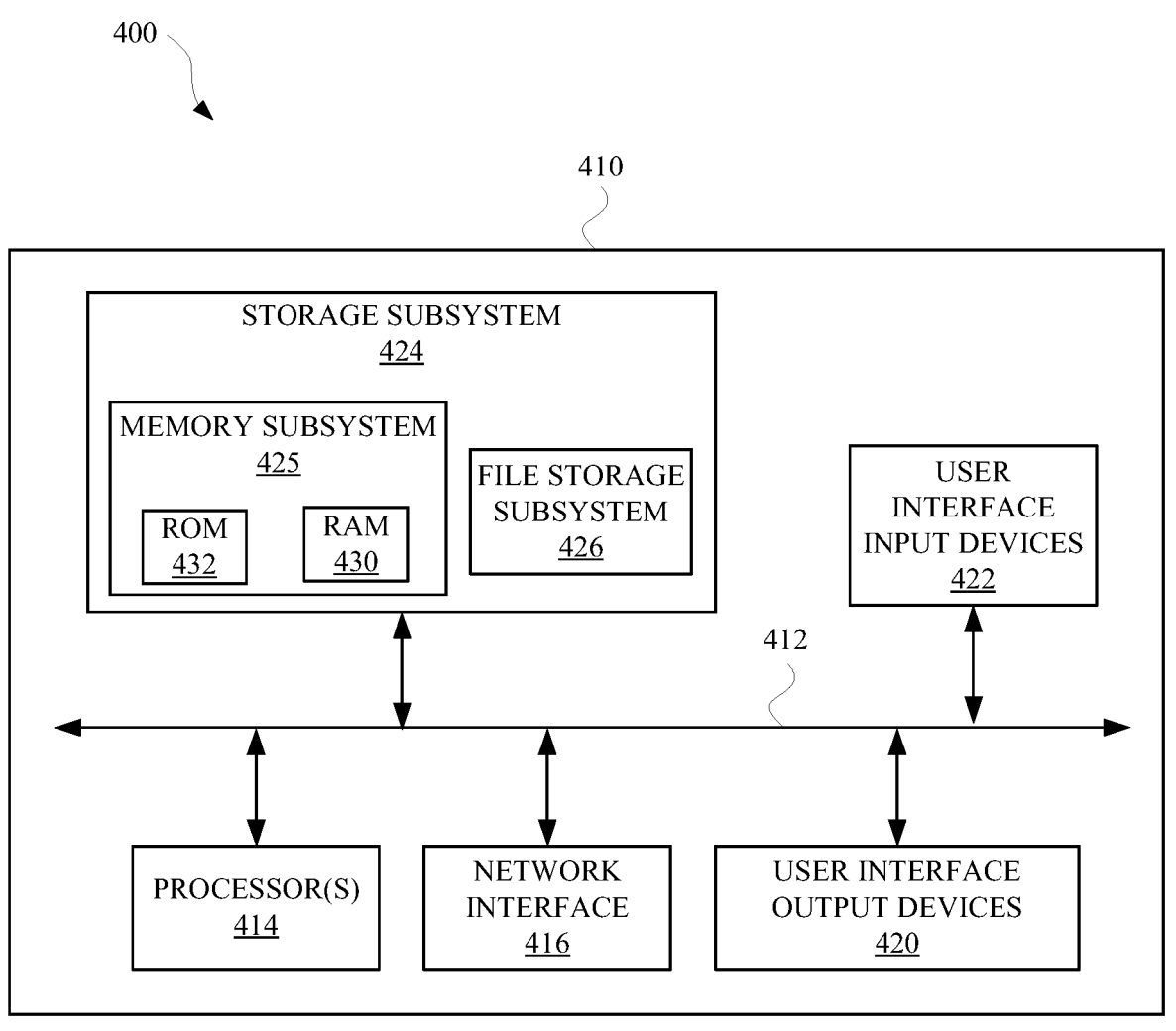
FIG. 4 schematically illustrates an example computer architecture on which selected aspects of the present disclosure can be implemented.

FIG. 4 is a block diagram of an example computing device 410 that can optionally be utilized to perform one or more aspects of techniques described herein. Computing device 410 typically includes at least one processor 414 which communicates with a number of peripheral devices via bus subsystem 412. These peripheral devices can include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 can include the logic to perform selected aspects of the methods of FIG. 3, as well as to implement various components depicted in FIGS. 1-2.

These software modules are generally executed by processor 414 alone or in combination with other processors. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem can use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein can be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations can be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In various implementations, a method can be implemented using one or more processors and can include: identifying an image that is captured by a camera of a mobile robot, where the image captures one or more particular components of an environment. The environment can optionally be an industrial automation facility that implements any number of at least partially automated processes, such as a chemical processing plant, an oil or natural gas refinery, a catalyst factory, a manufacturing facility, an offshore oil platform, or any other applicable industrial environment. The mobile robot can be a quadruped robot (e.g., a robot dog), a wheeled robot, an unmanned aerial vehicle, or any other applicable robot movable within the industrial automation facility. The camera can be a monographic RGB camera, a stereographic camera, a thermal camera, or any other applicable vision sensor. Correspondingly, the image can be an RGB image, an RGB-D image, a thermal image, or any other applicable image having an image dimension of m×n×c (where m, n, c are positive integer greater than or equal to 1).

In various implementations, the method can further include: processing the image, using a trained machine learning (ML) model, to generate a reduced dimensionality output that indicates, for each of N regions of the image, a corresponding probability that an anomaly is present in the region, where N is a positive integer less than (m×n). As a non-limiting example, the image can be a 1024×768 RGB image, and the reduced dimensionality output can indicate, for each of 3×3 (=9) regions of the image, a corresponding probability that an anomaly is present in a respective region of the nine regions. In this non-limiting example, the reduced dimensionality output can indicate, for instance, a first probability p1 for one or more anomalies being detected for a first region of the image, a second probability p2 for the one or more anomalies being detected for a second region of the image, . . . , and a sixteenth probability p16 for the one or more anomalies being detected for a sixteenth region of the image, where the first, second, . . . , and sixteenth regions together form the image.

As a non-limiting example, the reduced dimensionality output can include the first, second, . . . , and sixteenth probabilities, arranged in a matrix. The location of a probability (e.g., p2) in the matrix can correspond to the location of a respective region (e.g., the second region), in the image, for which the probability (e.g., p2) is predicted.

In various implementations, the method can further include: determining, based on the reduced dimensionality output, a quantity of the corresponding probabilities that each satisfy a threshold. In various implementations, the method can further include: determining whether the quantity is both greater than a lower bound value and less than an upper bound value. Continuing with the above non-limiting example, the threshold can be approximately 0.7, and the reduced dimensionality output can indicate p1=0.6, p2=0.8, p3=0.5, p4=0.75, p5=0.77, p6=0.82, p7=0.85, p8=0.5, p9=0.9, p10=0.65, p11=0.77, p12=0.58, p13=0.83, p14=0.3, p15=0.48, and p16=0.28. In this example, the quantity of the probabilities that each satisfy the threshold (e.g., 0.7) can be determined as 8 (p2=0.8, p4=0.75, p5=0.77, p6=0.82, p7=0.85, p9=0.9, p11=0.77, and p13=0.83). If the lower bound value is predefined to be "2" and the upper bound value is predefined to be "10", it can be determined that the quantity (e.g., 8) of probabilities satisfying the threshold is not only greater than the lower bound value (e.g., 2) but also less than the upper bound value (e.g., 10).

In various implementations, the method can further include: in response to determining that the quantity is both greater than the lower bound value and less than the upper bound value: causing rendering of an alert that indicates an anomaly is present for the one or more particular components. Continuing with the non-limiting example above, in response to determining that 8 out of 16 probabilities satisfy the threshold, where 2 (the "lower bound value")<8<10 (the "upper bound value"), an alert can be rendered alerting the one or more particular components is not free of anomaly. The alert can be a textual message (e.g., email, text, etc.) indicating the one or more particular components that face an anomaly, a confidence level of presence/detection of the anomaly for the one or more particular components, and/or a time at which the anomaly is detected, etc. The alert can also be an audio message informing possible presence of anomaly for the one or more particular components. If the quantity is greater than the upper bound value or lower than the lower bound value, no alert can be generated. For instance, if the quantity is greater than the upper bound value, there is a high chance that the image does not accurately or completely reflect the one or more particular components due to reasons such as a moving object (e.g., person) is present to block the one or more particular components when the image is being captured by the camera, or the image is subject to too much light when being captured, etc. If the quantity is lower than the lower bound value, it can be determined that no anomaly is present for the one or more particular components.

In some implementations, instead of or in addition to determining to cause rendering of the alert, the method can include: in response to determining that the quantity is both greater than the lower bound value and less than the upper bound value: cause one or more processes, within the environment, that involves the one or more particular components, to be paused.

In addition, some implementations include one or more processors of a mobile robot and/or of one or more computing devices, where the one or more processors are operable to execute instructions stored in associated memory, and where the instructions are configured to cause performance of any of the methods disclosed herein. Some implementations additionally or alternatively include one or more transitory or non-transitory computer readable storage media storing computer instructions executable by one or more processors to perform any of the methods disclosed herein.

In some implementations, a system is provided that includes one or more processors and memory storing instructions that, in response to execution by the one or more processors, cause the one or more processors to: identify an image that is captured by a camera of a mobile robot when the camera is at a first pose, where the image captures one or more particular components in an environment of the mobile robot; process the image, using a machine learning (ML) model, to generate a reduced dimensionality output that indicates, for each of N regions of the image, a corresponding probability that an anomaly is present in the region; determine, based on the reduced dimensionality output, a quantity of the corresponding probabilities that each satisfy a threshold; and determine whether the quantity is both greater than a lower bound value and less than an upper bound value.

In various implementations, the system can further include instructions to: in response to determining that the quantity is both greater than the lower bound value and less than the upper bound value: cause rendering of an alert that indicates an anomaly is present for the one or more particular components. In various implementations, the system can further include instructions to: in response to determining that the quantity is both greater than the lower bound value and less than the upper bound value: cause the one or more processes utilizing the one or more particular components to be paused.

In some implementations, a mobile robot is provided that includes a camera, memory storing instructions and storing a trained machine learning (ML) model; and one or more processors. The processor(s) are operable to execute the instructions to: receive, from the camera, an image capturing one or more particular components of an environment within which the mobile robot is deployed; process the image, using the trained ML model, to locally generate a reduced dimensionality output that indicates, for each of N regions of the image, a corresponding probability indicating whether an anomaly is present in a respective region, of the N regions of the image; determine, based on the reduced dimensionality output, a quantity of the corresponding probabilities that each satisfy a threshold; determine whether the quantity is both greater than a lower bound value and less than an upper bound value; and in response to determining that the quantity is both greater than the lower bound value and less than the upper bound value: communicate with one or more additional computing devices to cause rendering of an alert that indicates an anomaly is present for the one or more particular components.

What is claimed is:

1. A method implemented by one or more processors, the method comprising:

identifying an image that is captured by a camera of a mobile robot when the camera is at a first pose, wherein the image captures one or more particular components in an environment of the mobile robot;

processing the image, using a machine learning (ML) model, to generate a reduced dimensionality output that indicates, for each of N regions of the image, a corresponding anomaly detection probability indicating whether an anomaly is present in a respective region, of the N regions of the image, wherein N is an integer greater than one;

determining, based on the reduced dimensionality output, a quantity of anomaly detection probabilities that each satisfy a threshold;

determining whether the quantity is both greater than a lower bound value and less than an upper bound value; and in response to determining that the quantity is both greater than the lower bound value and less than the upper bound value:

causing rendering of an alert that indicates an anomaly is present for the one or more particular components.

2. The method of claim 1, further comprising:

selecting the ML model, for processing the image and from a plurality of candidate ML models, wherein selecting the ML model for processing the image is responsive to the image capturing the one or more particular components and the ML model being trained based on images corresponding to the one or more particular components.

3. The method of claim 1, further comprising:

selecting the ML model, for processing the image and from a plurality of candidate ML models, wherein selecting the ML model for processing the image is responsive to the image being captured at the first pose and the ML model being trained based on images corresponding to the first pose.

4. The method of claim 1, wherein N is greater than nine.

5. The method of claim 1, wherein the lower bound value is determined based on one or more types of the one or more particular components.

6. The method of claim 1, wherein the upper bound value is determined based on one or more types of the one or more particular components.

7. The method of claim 1, wherein one or both of the lower bound value and the upper bound value are selected based on a time at which the image is captured, and/or based on a light level of the environment.

8. The method of claim 1, wherein the camera is a monographic camera, a stereographic camera, an ultraviolet camera, or a thermal camera.

9. The method of claim 1, wherein the mobile robot is a wheeled robot, an unmanned aerial vehicle, or a quadruped robot.

10. The method of claim 1, further comprising:

in response to determining that the quantity is less than or equal to the lower bound value:

determining that no anomaly is detected for the one or more particular components.

11. The method of claim 1, wherein the one or more particular components include a liquid tank and/or a liquid that the liquid tank carries.

12. The method of claim 1, wherein the ML model is trained based on one or more training instances each including: (1) a corresponding image, and (2) N ground truth labels each indicating whether anomaly is present for a corresponding one of the N regions of the corresponding image.

13. The method of claim 4, wherein the lower bound value is 20% or less of N.

14. The method of claim 4, wherein the upper bound value is 50% or more of N.

15. A system, comprising:

one or more computing devices at least selectively in network communication with a mobile robot that includes a camera and that is deployed in an environment, wherein the one or more computing devices:

receive, from the mobile robot, an image that is captured by the camera, wherein the image captures one or more particular components in the environment;

process the image, using a trained machine learning (ML) model, to generate a reduced dimensionality output that indicates, for each of N regions of the image, a corresponding probability that an anomaly is present in a respective region, of the N regions of the image, wherein N is an integer greater than one;

determine, based on the reduced dimensionality output, a quantity of corresponding probabilities that each satisfy a threshold;

determine whether the quantity is both greater than a lower bound value and less than an upper bound value; and in response to determining that the quantity is both greater than the lower bound value and less than the upper bound value:

cause rendering of an alert that indicates an anomaly is present for the one or more particular components.

16. The system of claim 15, wherein the one or more computing devices further:

select the trained ML model, for processing the image and from a plurality of candidate ML models, based on determining the image is captured by the camera at a given pose and based on the trained ML model being trained based on images corresponding to the given pose.

17. The system of claim 15, wherein N is greater than nine.

18. The system of claim 15, wherein the lower bound value is 20% or less of N, and the upper bound value is 50% or more of N.

19. A mobile robot comprising:

a camera;

memory storing instructions and storing a trained machine learning (ML) model; and one or more processors operable to execute the instructions to:

receive, from the camera, an image capturing one or more particular components of an environment within which the mobile robot is deployed;

process the image, using the trained ML model, to locally generate a reduced dimensionality output that indicates, for each of N regions of the image, a corresponding probability indicating whether an anomaly is present in a respective region, of the N regions of the image, wherein N is an integer greater than one;

determine, based on the reduced dimensionality output, a quantity of the corresponding probabilities that each satisfy a threshold, determine whether the quantity is both greater than a lower bound value and less than an upper bound value; and in response to determining that the quantity is both greater than the lower bound value and less than the upper bound value:

communicate with one or more additional computing devices to cause rendering of an alert that indicates an anomaly is present for the one or more particular components.

* * * * *